United States Patent
Murakawa et al.

(10) Patent No.: US 7,636,706 B2
(45) Date of Patent: Dec. 22, 2009

(54) PARAMETER ADJUSTMENT DEVICE

(75) Inventors: Masahiro Murakawa, Tokyo (JP); Keiichi Ito, Tokyo (JP)

(73) Assignee: Evolvable Systems Research Institute Inc., Tokyo (JP)

( * ) Notice: Subject to any disclaimer, the term of this patent is extended or adjusted under 35 U.S.C. 154(b) by 0 days.

(21) Appl. No.: 10/584,350

(22) PCT Filed: Dec. 22, 2004

(86) PCT No.: PCT/JP2004/019163

§ 371 (c)(1),
(2), (4) Date: Jun. 23, 2006

(87) PCT Pub. No.: WO2005/064534

PCT Pub. Date: Jul. 14, 2005

(65) Prior Publication Data

US 2007/0150435 A1    Jun. 28, 2007

(30) Foreign Application Priority Data

Dec. 26, 2003    (JP) .............................. 2003-433656

(51) Int. Cl.
*G06F 17/30* (2006.01)
*G06G 7/00* (2006.01)
*G06F 15/16* (2006.01)

(52) U.S. Cl. .................. 707/2; 707/3; 707/4; 707/5; 707/6

(58) Field of Classification Search ................ 707/1–6, 707/203; 340/825; 701/200; 704/10; 705/7; 708/490; 709/201–229; 710/131–132; 714/4; 715/200–277; 718/106; 706/13; 370/238–432
See application file for complete search history.

(56) References Cited

U.S. PATENT DOCUMENTS 5,924,097 A  *  7/1999  Hill et al. ..................... 707/10

(Continued)

FOREIGN PATENT DOCUMENTS

EP    1 413 981 A1    4/2004

(Continued)

OTHER PUBLICATIONS

XP007907680; "Parallel Hybrid Meta-Heuristics: Application to the Quadratic Assignment Problem"; Proceedings of the Parallel Optimization Colloquium (POC'96): Mar. 25-27, 1996, Feb. 27, 1996.

(Continued)

*Primary Examiner*—Cam Y Truong
*Assistant Examiner*—Cecile Vo
(74) *Attorney, Agent, or Firm*—Manabu Kanesaka

(57) ABSTRACT

A parameter adjusting device configured to adjust a great number of parameters of a physical model by a genetic algorithm using multiple processing units within a short time. A parameter adjusting device comprises a processing assignment means wherein a part of a multiple processing means is assigned to search processing by a local search method, and assigns the processing of the local search to a low-performance processor. Also, the parameter adjusting device collects an interim result of the search by a genetic algorithm, and uses it for the search processing by the local search method. Through parallelization and efficiency of an adjusting processing by effectively utilizing the resource in the system, the parameter adjusting device can determine the group of the most appropriate parameters within a short time.

1 Claim, 6 Drawing Sheets

U.S. PATENT DOCUMENTS

| | | | | |
|---|---|---|---|---|
| 5,942,097 | A * | 8/1999 | Rapp | 205/386 |
| 6,542,468 | B1 * | 4/2003 | Hatakeyama | 370/238 |
| 7,236,971 | B1 * | 6/2007 | Shatdal et al. | 707/3 |

FOREIGN PATENT DOCUMENTS

| | | |
|---|---|---|
| JP | H08-272760 | 10/1996 |
| JP | H09-282288 | 10/1997 |
| JP | H10-097437 | 4/1998 |
| JP | 2003-288579 A | 10/2003 |

OTHER PUBLICATIONS

XP007907689; "A Survey of Parallel Distributed Genetic Algorithms"; Complexity, vol. 4, No. 4, Apr. 1999, pp. 31-52.

XP007907426; "Extraction of Compact Model Parameters for ULSI MOSFETs Using a Genetic Algorithm"; Technical Proceedings of the 1999 International Conference on Modelling and Simulation of Microsystems (MSM'99), Apr. 19-21, 1999, pp. 176-179.

XP007907695; "Chapter 5: Basic Usage"; Argonne National Laboratory (ANL) Report, No. 95/18, Jan. 1996, pp. 18-28.

XP007907694; "Chapter 9: Hill-Climbing and Hybridization"; ANL Report, No. 95/18, Jan. 1996, pp. 44-45.

XP007907693; "Appendix C: Parallelism Background"; ANL Report, No. 95/18, Jan. 1996, pp. 64-67.

* cited by examiner

PARAMETER ADJUSTMENT DEVICE

FIELD OF THE INVENTION

The present invention relates to a parameter adjusting device, especially, a parameter adjusting device that can adjust a great number of parameters of a physical model and so on by a genetic algorithm (hereinafter referred to as a GA) using multiple processing units (processors, CPU) within a short time.

BACKGROUND OF THE ART

Conventionally, a parameter adjusting device that automatically performs parameter fitting (adjusting) processing of a physical model including multiple parameters using the GA from an experimental result and so on is proposed. A reference for the GA is, for example, the following Japanese Nonpatent Publication 1. In addition, the GA in the present invention represents an evolutionarily computational technique, and includes an evolution strategy (ES) technique. A reference for the evolution strategy, for example, includes the following Japanese Nonpatent Publication 2.

Furthermore, in the following Japanese Patent Publication 1, a parameter adjusting device that automatically performs a parameter adjusting processing of a physical model including the multiple parameters using the GA is proposed.

Japanese Nonpatent Publication 1: David E. Goldberg, 1989, "Genetic Algorithms in Search, Optimization, and Machine Learning", published by ADDISON-WESLEY PUBLISHING COMPANY, INC.

Japanese Nonpatent Publication 2: H. P. Schwefel, 1995, "Evolution and Optimum Seeking", published by John Wiley & Sons.

Japanese Nonpatent Publication 1: Japanese Nonpatent Publication 1: No. 2003-108972

DISCLOSURE OF INVENTION

Problems to be Resolved by the Invention

In the above-mentioned conventional parameter adjusting method, the method for improving accuracy by performing parameter adjustment (search) using the GA at first, and a local search method in the final stage of the search, was used. However, since the search using the GA lowers searching speed in the final stage, when the GA tries to raise the accuracy, the processing time becomes longer. On the other hand, when the GA is switched to the local search method in the early stage, an optimal solution might not be obtained.

Also, GA processing is suitable for relatively parallel processing; however, the local search method is not suitable for high speed through parallel processing. In addition, depending on an applied model, the local search method has a possibility of reaching the optimal solution quicker than the GA does. However, even in the above-mentioned model, the processing time could not be shortened by the conventional method.

Means of Solving the Problems

The present invention is made in order to solve the above-mentioned problems, and the main feature of the parameter adjusting device of the invention is that, in the parameter adjusting device optimizing parameters using a genetic algorithm with multiple processing means (CPU), a processing assignment means wherein a part of the multiple processing means is assigned to search processing by a local search method such as Powell method is provided.

Also, when performances of multiple processors are not equal, the present invention assigns processing of the local search to a low-performance processor. Also, the present invention collects an interim result of the search from the processor being assigned to the processing by the genetic algorithm in the multiple processors, and uses it for the search processing by the local search method.

In addition, the present invention includes an individual decision means which determines the group of individuals being processed by the genetic algorithm through the processing means being assigned to the processing by the GA in the multiple processing means according to the respective processing capability of each processor's means. Furthermore, the multiple processors include a determination means determining whether to satisfy respective search processing termination conditions. When a termination is determined in an optional processor, the present invention terminates the entire processing of the device.

Effect of the Invention

According to the above-mentioned features, a parameter adjusting device of the present invention has an effect to be able to determine a group of the most appropriate parameters within a short time by: effectively utilizing a resource inside a system; parallelizing fitting processing; and making the fitting processing more efficient.

EXPLANATION OF SYMBOLS 10, 11, 12, 13 ... CPU
14 ... LAN
15 ... Keyboard
16 ... Display

DETAILED DESCRIPTION OF PREFERRED EMBODIMENTS

A parameter adjusting device of the present invention can be used in order to run a simulation of a transistor with an optional shape using the model generated by optimizing the model parameters which is calculated with the model function that expresses the transistor's electric property using the electric property data measured from several transistors with a different shape experimentally. However, the present invention is not limited to the example described hereinabove, and can be applied to optional processings using the GA. Hereinafter, embodiments of the present invention will be explained.

Embodiment 1

Figure 1:
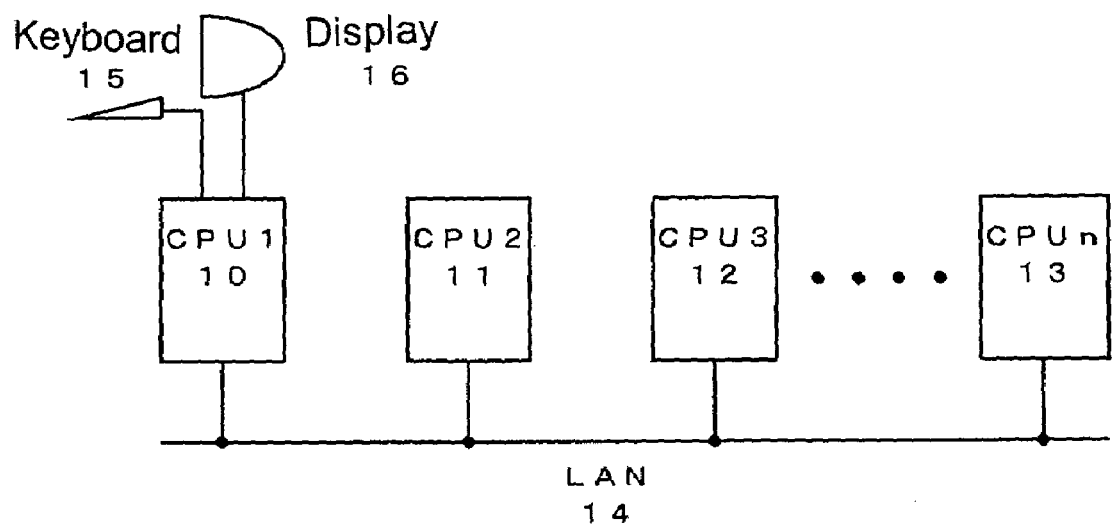
[FIG. 1] is a block diagram showing a hardware structure of an embodiment of the parameter adjusting device of the present invention.

FIG. 1 is a block diagram showing the hardware structure of an embodiment of the parameter adjusting device of the present invention. Well-known personal computers of CPU1 (10)~CPUn(13) with n units are connected by a LAN14. A well-known display 16 and keyboard 15 for data input and output are connected to the CPU1(10); however, the display 16 and keyboard 15 may be connected to the other CPUs. A well-known data input and output device may be installed in each CPU. The parameter adjusting device of the present invention can be realized by creating and installing a program described hereinafter in each CPU.

Incidentally, the above-mentioned structure is an example, and when a number of CPUs are installed on a server, or when a number of personal computers are connected via the Internet, the present invention can be applied to optional computer systems which can substantively perform parallel processing by a number of processing units (CPU). Also, even when one CPU such as a hyper-threading function and so on can substantively perform a number of processing in parallel, the present invention can be applied.

Figure 2:
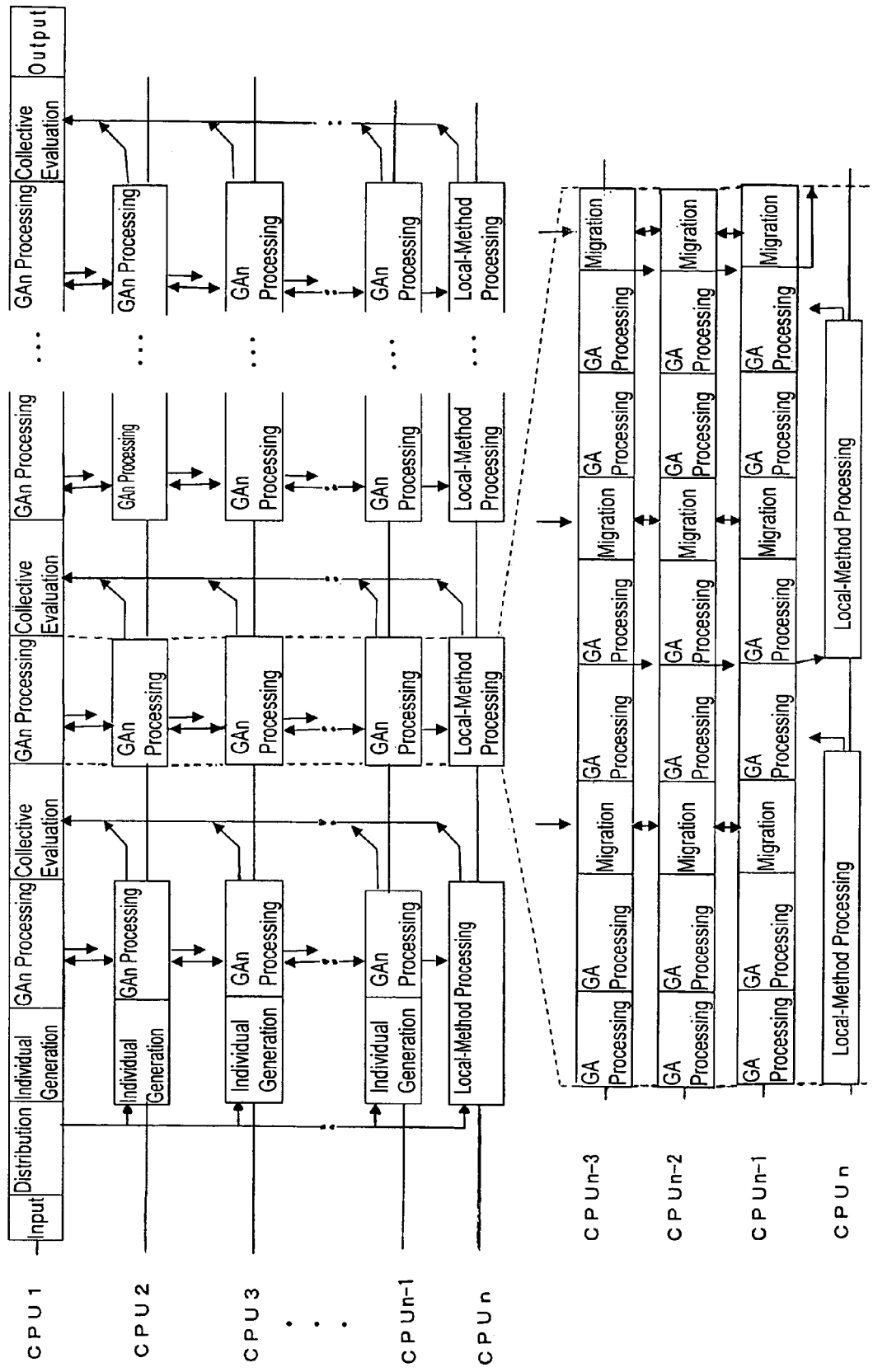
[FIG. 2] is a schematic time chart showing a parameter adjusting processing using the GA of the present invention.

FIG. 2 is a schematic time chart showing a parameter adjusting (fitting) processing using the GA of the present invention. The CPU1 functions as an administrative CPU, and performs: data input and output; a processing assignment to the other CPUs; and the management of the entire parameter adjusting processing other than GA processing (local-method processing). The CPU2~CPUn-1 are CPUs being assigned to the GA processing. The CPUn is the CPU being assigned to local-method search processing. Incidentally, the reference alphabet n represents an integer 2 or more.

The CPU1 collects processing results (superior individual information) from the other CPUs with respect to each predetermined cycle (generational change processing of the predetermined number of the GA=GAn processing), and determines termination conditions. When the termination conditions are satisfied, the CPU1 terminates the entire processing, and outputs a result. Every time the CPU1 for the management gives an instruction, the CPU for the GA processing performs the GAn processing. Migration processing is performed during the GAn processing, wherein the CPUs for the other GA and an individual are exchanged over the predetermined cycle. Also, over an independent cycle from the above-described cycle, the superior individual information is transmitted to the CPUn for the local method (or via the CPU for the management) at that point.

When the CPUn for the local method receives individual (parameter) information via the CPU for the management or the CPU for the GA, the CPUn for the local method optimizes (searches) the parameters by a heretofore known local search method, and transmits a search result to the CPU for the management.

Figure 3:
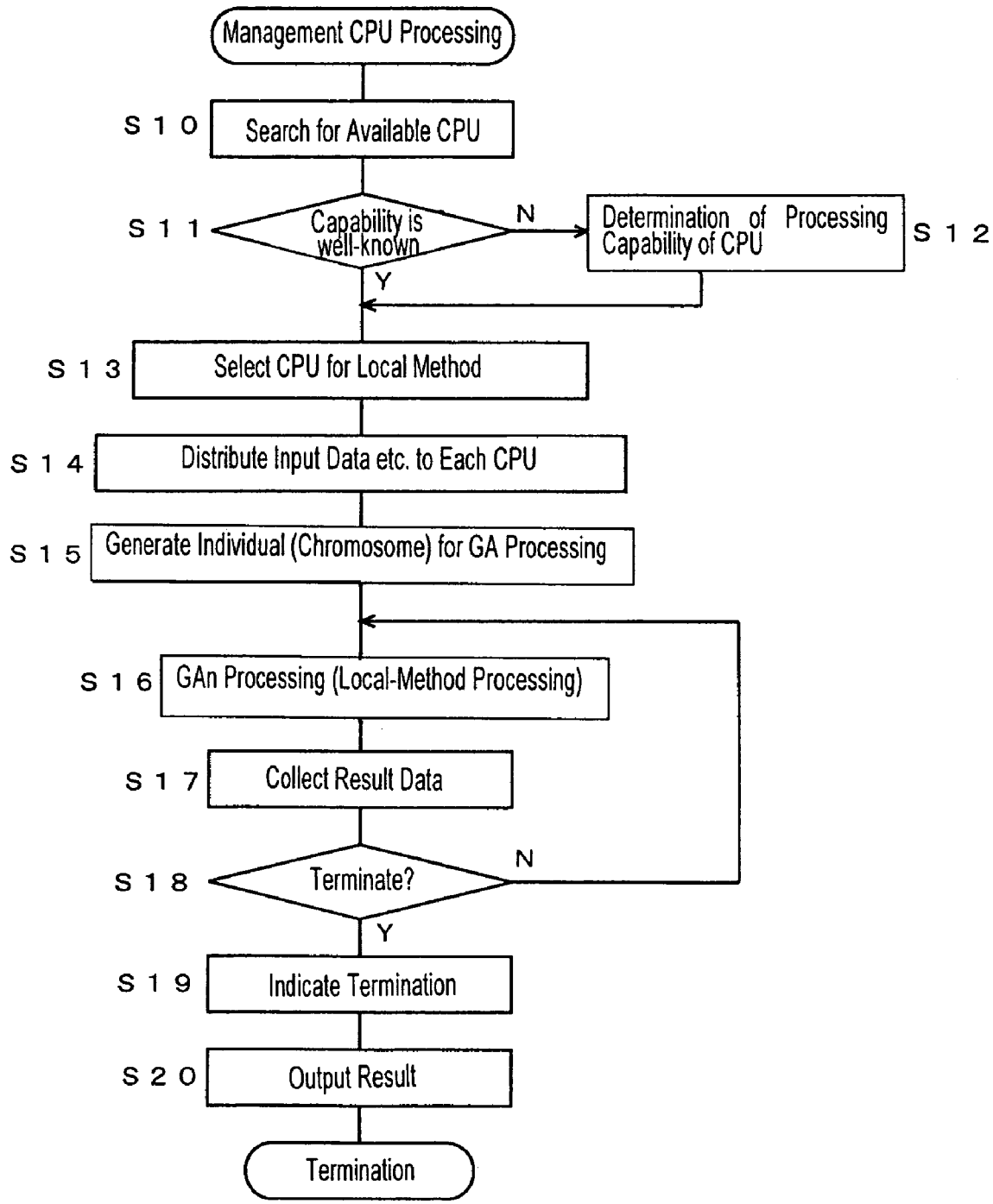
[FIG. 3] is a flowchart showing contents of processing in an administrative CPU1.

FIG. 3 is a flowchart showing contents of the processing in an administrative CPUI. In a S10, the other CPUs available to the GA or local method are searched. In a S11, it is determined whether or not processing capabilities of the available CPUs are well-known, and when a determined result is negative, the S11 is transferred to S12. In the S12, the processing capabilities determine the processing capabilities of unforeknown CPUs. As a capability, a method such that the capability is measured by measuring the processing time through a simple benchmark testing program wherein clock frequency information of the CPU is retrieved, can be adopted.

In S13, the CPU for the local method is selected. As a selection condition, for example, the CPU with the lowest processing capability is selected. The CPU1 for the management may be selected as the CPU for the local method; however, in this example, another CPUn shall be selected. Incidentally, the processing of the S10~13 may be performed beforehand. The CPU available to the management CPU1, the processing capability, the processing assignment, and so on may be registered beforehand.

In S14, input data necessary to the GA or the local-method processing is distributed to each CPU. In S15, an individual (chromosome) for the GA processing in the CPU for the management is generated. For example, in the case of the semiconductor manufacturing line, N chromosomes (individuals), wherein the whole physical model functions of a transistor or a value of a part of the parameters are the genes, are generated, and are considered as an individual population. An individual generation determines the value of the genes in the chromosomes. Incidentally, in a physical model of a transistor such as the heretofore known BSIM, a range of recommended parameter initial values is set, so that in each parameter, the initial value is determined randomly within the range of the recommended parameter initial value, and becomes the value of the genes.

The number of the individuals N is basically determined based on the number of the parameters being required to be adjusted. In the embodiment, for example, it may be that the number of the individual N=the number of the parameter×a constant (for example, 5~15). Incidentally, the larger the number of the individual N, the better the accuracy: however, the longer the processing time. On the other hand, when the multiple CPUs with different processing capabilities perform the GA processing of the same individual number N, a quick CPU has to wait until a slow CPU completes the processing. As a result, the processing time of the multiple CPUs being assigned to the GA may be roughly the same by increasing the N for the CPUs with larger processing capability.

In an S16, the after-mentioned GAn processing (or the local-method processing) is performed. In an S17, processing result data of the entire CPUs including one's own data are collected. In an S18, whether or not the termination condition is satisfied is determined. The termination condition is that, for example, a condition of any of the following (1)~(3) is satisfied. (1) The evaluated value of any individuals has reached more than the target value set beforehand. (2) The increase rate of the evaluated value has become below the predetermined value. (3) The iteration of calculation has surpassed the predetermined value.

In an S19, a termination is indicated relative to all the CPUs, and in an S20, a result is outputted at, for example, a display, printer, file, and so on. Incidentally, when the information of the above-mentioned termination condition (1) is transmitted through the other CPUs during the processing of the S16, the processing of the S16 may be paused immediately and transferred to the S19.

Figure 4:
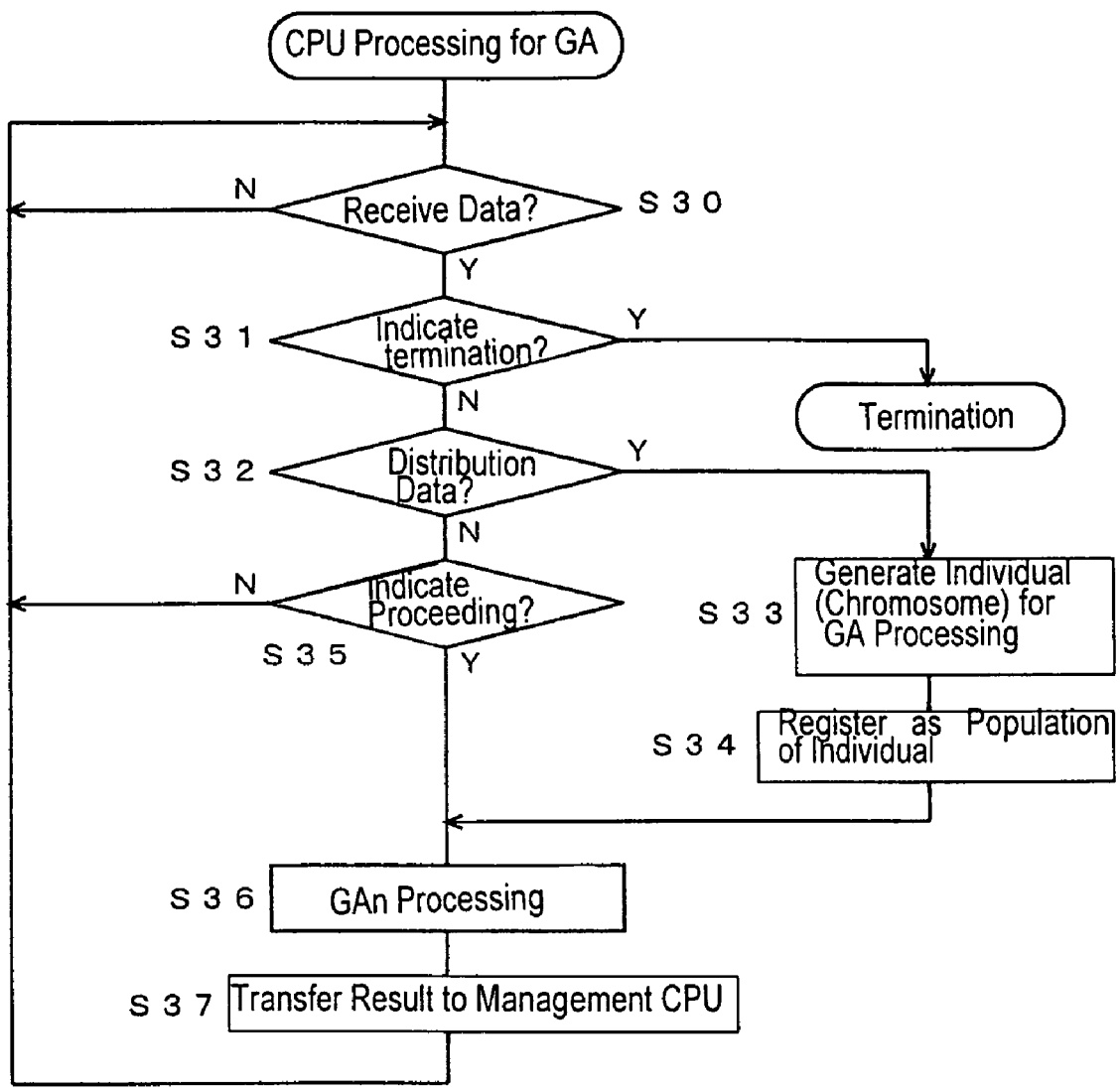
[FIG. 4] is a flowchart showing contents of CPU processing for the GA.

FIG. 4 is a flowchart showing the contents of the CPU processing for the GA. In an S30, it is held until the data is received through the management CPU. In an S31, if the received data indicates termination, the processing is terminated. In an S32, whether or not the received data is the distributed data in the S14 is determined, and when the determination result is affirmative, the received data is transferred to an S33. In the S33, the individual (chromosome) for the GA processing in its CPU is generated. This processing is the same processing with the S15. In an S34, the generated individual is registered as the parent population and transferred to an S36.

In an S35, whether or not the received data is a continued instruction is determined, and when the determination result is affirmative, the received data is transferred to the S36. In the S36, the GAn processing which is the generational change processing with the predetermined number of the GA described hereinafter is performed. In an S37, the superior individual information with a predetermined individual number which is the result of the GA processing, is transferred to the management CPU, and returned to the S30.

Figure 5:
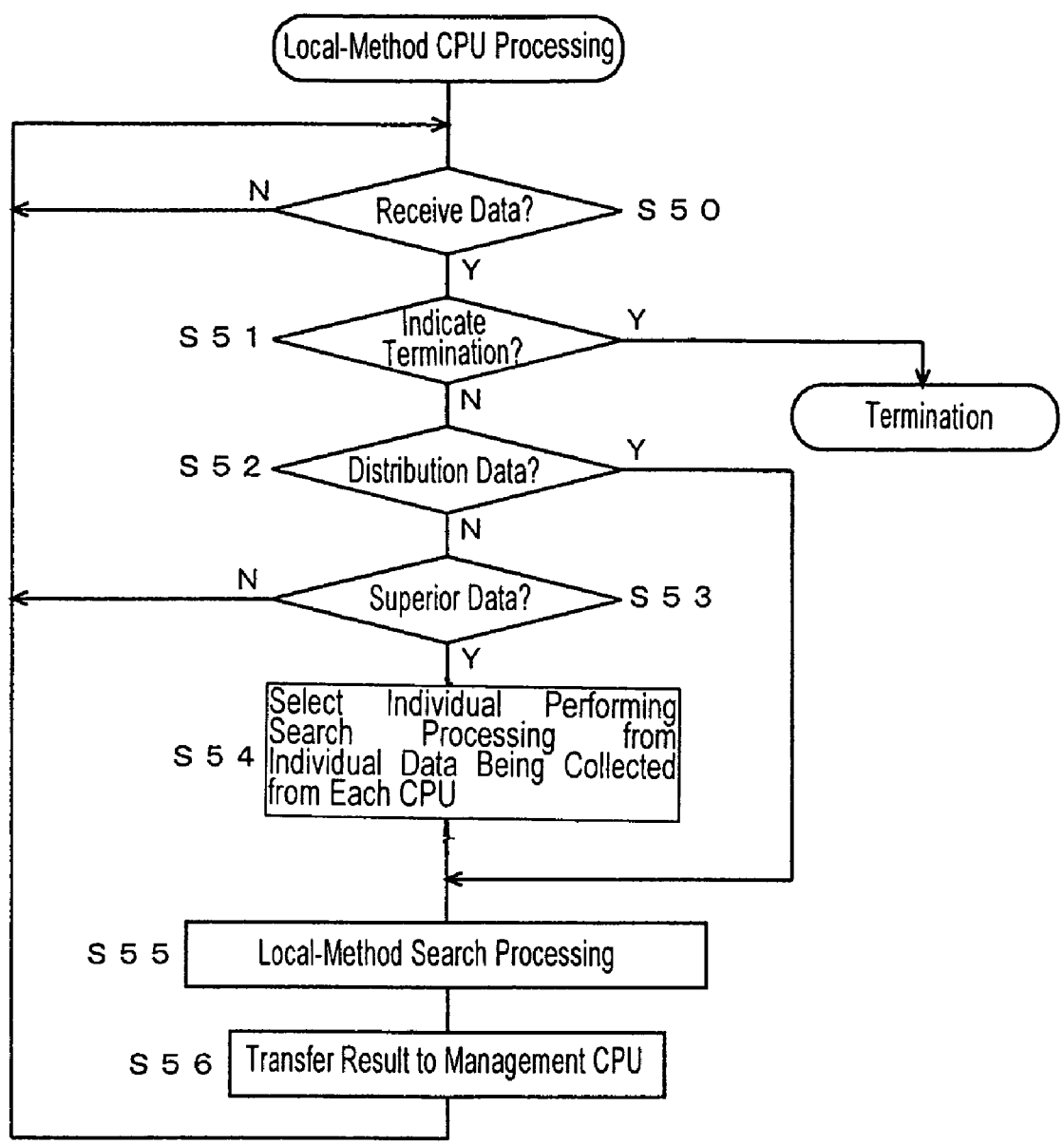
[FIG. 5] is a flowchart showing the contents of CPU processing for a local method.

FIG. 5 is a flowchart showing the contents of the CPU processing for the local method. In an S50, it is held until the data is received through the management CPU. In an S51, if the received data indicates termination, the processing is terminated. In an S52, whether or not the received data is the distributed data in the S14 is determined, and when the determination result is affirmative, the received data is transferred to an S55.

In an S53, whether or not the data of an interim result being transmitted from the CPU for the GA is the superior data is determined, and when the determination result is affirmative, the received data is transferred to an S54. In the S54, the individual for performing the search processing is selected from the superior individual data sorted by the evaluated values, collected from each CPU in order of evaluated value, and so on. Incidentally, if the CPU for the local method can perform the local-method search processing more than once during the GAn processing of the other CPUs, the number of the individual being selected within a performable range may be multiple, and in the case of a multiple number, the search processing with the local method is processed one-by-one in order.

In the S55, the parameter adjustment, i.e., the superior parameter search is performed by, for example, the heretofore known Powell method as mentioned in, for example, "NUMERICAL RECIPES in C, Gijutsu-Hyohron Co., Ltd., 1993" and so on, or the other heretofore known local search method. Since the processing has a light processing load compared to the GA processing, even if the CPU has a low processing capability, the processing can be performed within a short time compared to the GA processing. In an S56, the superior individual information with the predetermined individual number which is the result of the processing is transferred to the management CPU, and returned to the S50.

Figure 6:
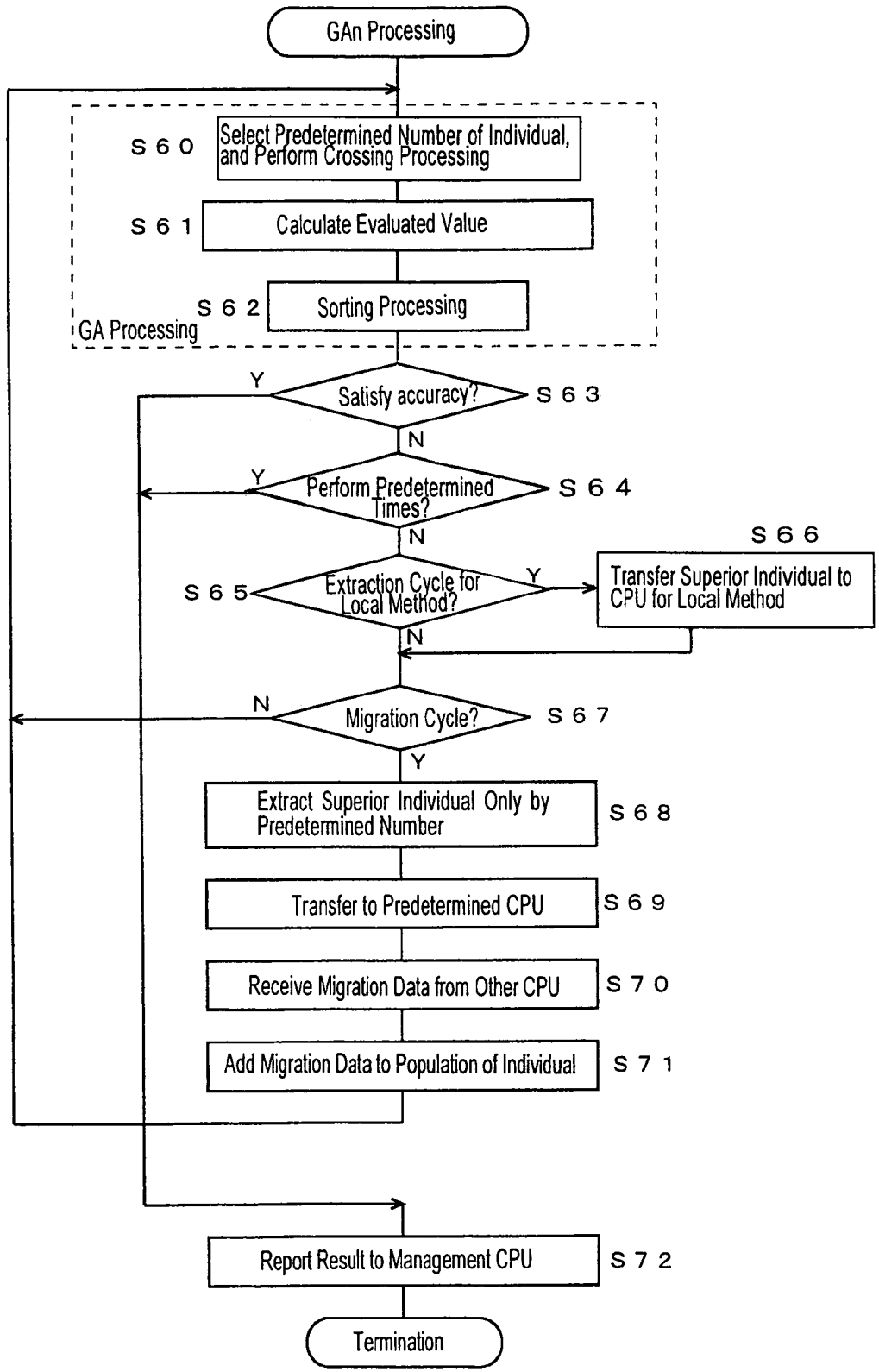
[FIG. 6] is a flowchart showing the contents of GAn processing of S16, S36.

FIG. 6 is a flowchart showing the contents of GAn processing which are the generational change processing of the predetermined number of the GA of the S16, S36. In S60~S62, generation update processing for a generation in the heretofore known genetic algorithm processing is performed. Incidentally, details are written in the above-mentioned Japanese Patent Publication. First, in the S60, the individual is selected randomly from the parent population by the predetermined number, and generates a child individual by crossover processing. Crossover processing is a processing wherein: a copy of a selected parent individual is respectively generated by an arbitrary number; and a part of the gene is exchanged between the copy individuals; or a new gene is generated from each gene, so that a child individual with an arbitrary number is generated.

In the S61, the evaluated value of the child individual being generated at the S60 is calculated. The evaluated value is the value showing how close to an ideal value the gene in the chromosomes is as the parameter. In the case of being applied to a semiconductor manufacturing line, square error between: estimated value of the property being calculated by the transistor model function which expresses the electric property wherein the genes in the chromosome is the model parameters; and measured value of the property being obtained by an experimental test of the transistor is calculated. The lower the square error value becomes, the better the estimation is.

In the S62, only the number of individuals which are retrieved from the parent individuals being selected in the S60 and the generated child individuals in order of highest value is returned to the parent population, and the rest is abandoned. Due to this processing, a low-valued chromosome is eliminated. Incidentally, in addition to this, the following method in which: a part of the parent individuals is returned to the population as it is without being selected as the object of the natural selection and the number of "the rest of the parent individual" is returned in the order of the highest value from the rest of the parent individuals and the child individuals; or after the whole individuals are returned to the parent population, only original number of the parent population is left and the others are eliminated may be used.

Generally, in the GA, a mutation method is applied in addition to crossover method. However, for example, in the above-mentioned Japanese Patent Publication, since the genes of the child individuals are generated using random numbers in the process of the crossover, the property of the mutation is also included. Therefore, in the case of using the above-mentioned crossover method, the mutation is not required to be performed additionally. Incidentally, in the case of the GA handling real number value, the operation wherein normal random numbers being generated according to a normal distribution are added to each gene of the chromosomes, is proposed as a mutation processing, and the above-mentioned mutation processing may be added.

In an S63, whether or not accuracy, i.e., an error of the experimental result of the physical model using the parameters of the individuals being equal to the most highly-evaluated value meets the target value is determined, and when the determination result is affirmative, the received data is transferred to an S72. In the S64, whether or not the GA processing (generational change) is performed by a determined iteration beforehand (6 times in FIG. 2), is determined, and when the determination result is affirmative, the received data is transferred to the S72.

In an S65, whether or not an individual extraction cycle for the local method (3 times in FIG. 2) is presented is determined, and when the determination result is affirmative, the received data is transferred to an S66. In the S66, the superior individuals are transferred to the CPU for the local method only by the predetermined number. In an S67, whether or not a migration cycle (twice in FIG. 2) is presented is determined, and when the determination result is affirmative, the received data is transferred to an S68. However, when the determination result is negative, the received data is returned to the S60.

A parallel GA system of the present invention allows each child population to become independent with respect to each processor and evolve. Consequently, the GA process in each processor lowers the diversity of a solution compared to the GA process of a parent population, so that the fitting capability goes down. Consequently, the processing referred to as migration is added. Migration is the process of replacing the chromosomes among child populations in the respective CPUs. By this processing, the diversity of the solution is maintained, and the fitting capability which is the same or more than the fitting capability during the single population processing is maintained.

In the S68, the superior individuals are extracted only by the predetermined number. In an S69, the data of the extracted individual is transferred to the predetermined CPU. The forwarding CPU may be fixed beforehand, or a table or an arithmetic expression which determines to which CPU will be transferred for what time may be created and distributed beforehand. As an example, the data may be transferred in a ring such that, for example, the CPU1 data is transferred to the CPU2, the CPU2 data is transferred to the CPU3 . . . the CPUn-1 data is transferred to the CPU1. In an S70, the data migrated from the other CPUs is received. In an S71, the data migration in an S70 is added to the parent population of the individual, and returned to the S60.

When the termination is determined, the superior individual information with a predetermined number which is the result of the processing in the S72, is transferred and reported to the management CPU, and the GAn processing is completed.

By the above-mentioned structure and processing, high-accuracy parameter adjustment can be performed within a short time. By adopting the relevant parameters to the physical model, a high-accuracy circuit simulation can be performed without a test, so that efficiency in manufacturing a semiconductor device improves.

Embodiment 1 is explained in the above; however, the following transformational example is used as the parameter adjusting device of the present invention. In the embodiment, the example where: the individual for the local-method processing periodically transmits the superior individual information is disclosed; however, in the case that the individual information satisfying the predetermined accuracy in the CPUs for each GA appears, the individual information may be transmitted to the CPU for the local method as needed.

In the embodiment, the example wherein each CPU is assigned to any of the GA processing or the local-method processing is disclosed; however, in the case that, for example, there is only one CPU with a high processing capability, both of the GA processing and the local-method processing can be assigned to the CPU with the highest processing capability, and only the GA processing can be assigned to the other CPUs.

In the embodiment, the example wherein the superior interim result of the GA processing is searched by the local method is disclosed; however, in the case wherein there are multiple peaks of the evaluated values in a parameter space, when the superior interim result of the GA processing can be classified into the multiple groups being able to be fitted within the predetermined range in the parameter space, the representative individuals of each group may be searched by the local method.

INDUSTRIAL APPLICABILITY

The parameter adjusting device of the present invention can be applied to an optional parameter adjusting device optimizing a parameter using the genetic algorithm with multiple processing means.

What is claimed is:

1. A parameter adjusting device comprising:
a processor;
a plurality of processing device forming parameter regulation device configured to optimize parameters using a genetic algorithm;
a first part of said plurality of processing devices being assigned to search using a local method;
a second part of said plurality of processing devices being assigned to processing of the genetic algorithm, said part of said plurality of processing devices being respectively configured to individually and simultaneously execute the genetic algorithm by performing predetermined times to determine an individual extraction cycle for the local search method, extracting superior individuals by the predetermined times and transferring the superior individuals to central processing unit for the local search method;
migration devices which, for a predetermined number of generation change processing of the genetic algorithm, send individuals from a parent population of the individuals being processed by the genetic algorithm, to predetermined others of said plurality of processing devices and receive a predetermined number of individuals from predetermined other processing devices to the parent population; and
search processing control configured for collecting interim results of searches from the processing devices assigned to the processing by the genetic algorithm and using search processing by the local search method,
wherein program optimizing parameters using any one of the genetic algorithm and the local search method is installed in one central processing unit (CPU) of the plurality of processing devices or one CPU in a plurality of CPUs of a server, and
wherein each device of said plurality of processing devices includes a determination device determining whether to satisfy search processing termination conditions, and when a termination is determined in a selected optional processing devices, an entire processing of the processing devices is terminated.

* * * * *